(12) United States Patent
Tan et al.

(10) Patent No.: US 8,275,266 B2
(45) Date of Patent: Sep. 25, 2012

(54) FREE-SPACE OPTICAL INTERCONNECT WITH ASYMMETRIC LIGHT PIPES

(75) Inventors: Michael Tan, Menlo Park, CA (US); Sagi Mathai, Palo Alto, CA (US); Paul Rosenberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 12/263,360

(22) Filed: Oct. 31, 2008

(65) Prior Publication Data

US 2010/0028018 A1    Feb. 4, 2010

Related U.S. Application Data

(60) Provisional application No. 61/137,866, filed on Aug. 1, 2008.

(51) Int. Cl.
*H04B 10/00* (2006.01)

(52) U.S. Cl. ........ 398/131; 398/118; 398/119; 398/130; 398/164

(58) Field of Classification Search .............. 398/34, 398/103, 118–120, 126–131, 140, 141; 250/216, 250/237, 237 G; 385/12–17, 33; 359/15
See application file for complete search history.

(56) References Cited

U.S. PATENT DOCUMENTS

| 5,857,042 A | * | 1/1999 | Robertson et al. | 385/33 |
| 6,033,515 A |   | 3/2000 | Walters et al. | |
| 6,360,039 B1 |   | 3/2002 | Bernard et al. | |
| 6,542,231 B1 | * | 4/2003 | Garrett | 356/246 |
| 6,547,400 B1 | * | 4/2003 | Yokoyama | 353/98 |
| 6,758,935 B2 |   | 7/2004 | Bernard et al. | |
| 6,760,503 B1 | * | 7/2004 | Hermann | 385/17 |
| 6,780,274 B2 |   | 8/2004 | Bernard et al. | |
| 7,039,265 B2 | * | 5/2006 | Levy et al. | 385/14 |
| 7,446,298 B1 | * | 11/2008 | Stone | 250/216 |
| 2004/0041984 A1 | * | 3/2004 | Tani et al. | 353/20 |

* cited by examiner

*Primary Examiner* — Li Liu

(57) ABSTRACT

An optical interconnect system includes components such as circuit boards, server blades, or a backplane with respective light pipes for an optical signal. The light pipe in a component transmitting the optical signal receives a collimated beam and directs the collimated beam for transmission. The light pipe in a receiving component is nominally aligned with the light pipe pf the transmitting component and separated from the first light pipe by free space. The light pipe on the receiving side is larger than the light pipe on the transmitting side and can therefore accommodate an expected alignment error.

20 Claims, 2 Drawing Sheets

FREE-SPACE OPTICAL INTERCONNECT WITH ASYMMETRIC LIGHT PIPES

CROSS-REFERENCE TO RELATED APPLICATION

The present application claims priority from provisional application Ser. No. 61/137,866, filed Aug. 1, 2008, the contents of which are incorporated herein by reference in their entirety.

BACKGROUND

High data rate signal transmission is a concern in many systems. Current server systems, for example, often use a set of user-selected components that need to communicate with each other at high data rates. In a blade server system, for example, the blades, e.g., server blades and storage blades, are mounted in a common enclosure and share system components such as cooling fans, power supplies, and enclosure management. For the blades to work together and provide the desired data storage, processing, and communications, the server system needs to provide high data rate communication channels for communications among the blades.

Data channels using electrical signaling generally require high frequency electrical signals to provide high data transmission rates, and the high frequency oscillations can present impedance and noise problems for electrical signals transmitted over conductors such as copper wires. Data channels using optical signaling can avoid many of these problems, but guided optical signaling may require complex waveguides and couplers and/or dealing with loose optical cables or ribbons and their connections. The optical cables or ribbons may introduce space and reliability issues. Free-space optical signaling avoids impedance and noise problems associated with electrical signals, and the need for waveguides or optical cables and complex couplers that connect cables or waveguides together. However, use of a free-space optical data channel in a system such as a server generally requires the ability to precisely align an optical transmitter and an optical receiver and the ability to maintain the alignment in an environment that may experience mechanical vibrations and thermal variations. Accordingly, systems and methods for economically and efficiently establishing and maintaining free-space optical channels are desired.

SUMMARY

In accordance with an aspect of the invention, an optical interconnect system includes a first component having a first light pipe and a second component having a second light pipe that is larger than the first light pipe. The first light pipe is positioned to receive a collimated optical signal beam and to direct the collimated optical signal beam for transmission from the first component. The second light pipe is nominally aligned with the first light pipe and separated from the first light pipe by a free-space gap. The size of the second light pipe can be made larger than the size of the first light pipe to accommodate expected error in the alignment of the second light pipe with the first light pipe.

Another embodiment of the invention is a method for transmitting information. The method includes: collimating an optical signal representing the information; directing the collimated optical signal through a first light pipe; and aligning a second light pipe with the first light pipe. The alignment has an expected alignment error, and the second light pipe is larger than the first light pipe by a margin that accommodates the expected alignment error. Accordingly, the second light pipe can receive the optical signal from across a free-space gap even when the light pipes are not perfectly aligned.

BRIEF DESCRIPTION OF THE DRAWINGS

Use of the same reference symbols in different figures indicates similar or identical items.

DETAILED DESCRIPTION

In accordance with an aspect of the invention, a high data rate communication system employs a smaller light pipe at an optical transmitter and a larger light pipe at an optical receiver. The smaller light pipe receives a collimated optical signal from the transmitter and directs the optical signal toward the larger light pipe. The larger light pipe provides tolerance for misalignment of the light pipes and divergence of the signal beam. Since the light pipes maintain the collimation of an optical signal over the length of the light pipes, the optical signal can be transmitted through a free-space gap between the light pipes. The free-space gap between the light pipes can be narrow enough to provide no more than an acceptable signal loss from the transmission of the optical signal across the free-space gap. Accordingly, the communication system can bridge a separation between transmitter and receiver that is greater than can be easily bridged by direct transmission of a collimated optical signal. Further, cumbersome couplers for optical fibers or ribbons are not required for connection of the receiver and transmitter.

Figure 1:
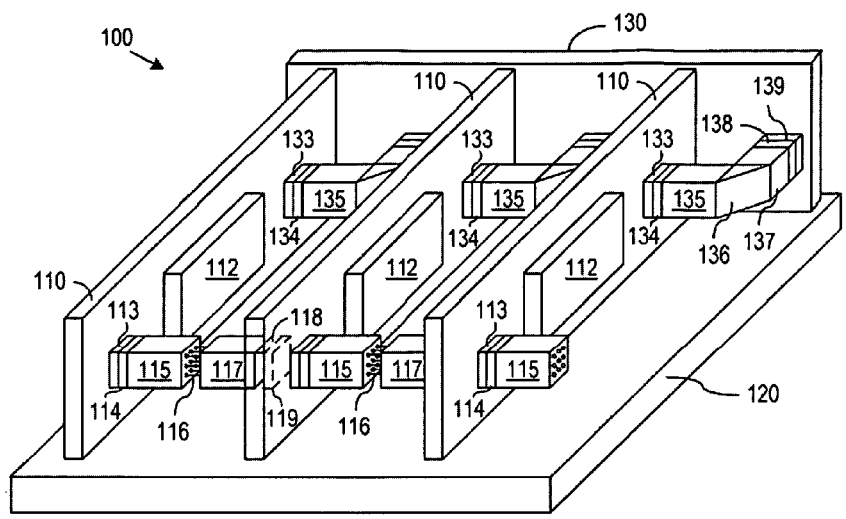
FIG. 1 shows a blade server system in accordance with an embodiment of the invention employing alignment-tolerant free-space data channels for communications among system planes or blades.

FIG. 1 illustrates a blade server system 100 employing communication channels in accordance with an embodiment of the invention. System 100 includes a set of blades 110 that are mounted on a chassis 120 and connected to a shared backplane 130. Additional components such as power supply transformers and cooling fans (not shown) can also be connected to chassis 120 or backplane 130, and the entire assembly would typically be contained in a shared enclosure (not shown). A user interface and sockets for external connections to server system 100 may be provided through the shared enclosure.

Some or all of blades 110 in system 100 may be substantially identical or of differing designs to perform different functions. For example, some blades 110 may be server blades or storage blades. Each blade 110 includes one or more subsystems 112 that implement the particular functions of the blade 110. Subsystems 112 may be mounted on either one or both sides of each blade 110 in the manner of components on a printed circuit board, or blades 110 may include enclosures with subsystems 112 in the interior of the blade 110. Typical examples of such subsystems 112 include hard drives or other data storage and processor subsystems containing conventional computer components such as microprocessors, memory sockets, and integrated circuit memory. Subsystems 112 and the general features of blades 110 may be of conventional types known for server systems using blade architectures, such as the c-class architecture of server systems commercially available from Hewlett-Packard Company.

Each blade 110 can employ optical signals for communication with adjacent blades 110 or with backplane 130. For direct communication with neighboring blades 110, each blade 110 includes one or more arrays of optical transmitters 113 and one or more arrays of optical receivers 119. Each transmitter array 113 is positioned on a blade 110 to be nominally aligned with a corresponding receiver array 119 on a neighboring blade 110 when the blades 110 are properly mounted on chassis 120. A typical configuration for server system 100 may have about 5 cm of free space between corresponding transmitter array 113 and receiver array 118, and each receiver array 116 may be subject to translational misalignment on the order of about 500 to 1000 μm and angular misalignment of up to about 1.5° relative to the associated transmitter array 113 due to variations in the mechanical mounting of blades 110. Additionally, the alignment of arrays 113 and 118 may be subject to variations on the order of 40 to 50 μm and up to 2° due to fabrication tolerances, temperature variations, and/or mechanical vibrations, for example, from the operation of cooling fans or hard drives.

Each transmitter array 113 includes an array of light sources or emitters such as vertical cavity surface emitting lasers (VCSELs) or light emitting diodes (LEDs) that can be integrated into or on an integrated circuit die. Each light source in array 113 emits a beam 116 that can be modulated to encode data for transmission at a high data rate, e.g., about 10 Gb/s. On the transmitter side, beams 116 from a transmitter array 113, pass through an array 114 of collimating lenses, and a block 115 containing light pipes.

Each receiver array 119 generally includes an array of detectors, e.g., photodiodes with each photodiode having a light sensitive area of a size selected according to the data rate of the signal received at the photodiode. For a data rate of 10 Gb/s or more, the width of light sensitive area generally needs to be less than about 40 μm across to provide an acceptable capacitance for a high frequency electrical signal produced by the photodiode. The receiver side also includes a block 117 of light pipes and a lens array 118 positioned to focus light from light pipes 117 on the active areas of the photodiodes in receiver array 119.

Light pipe block 115 and light pipe block 117 are separated by a gap, so that optical signal beams from light pipes in block 115 pass through free space or air before entering light pipes in block 117. A mechanical alignment structure (not shown) attached to blocks 115 and 117 can be used to align blocks 115 and 117, and the mountings of arrays 113 and 119 and blocks 115 and 117 may provide limited freedom of motion to permit the mechanical alignment system to bring light pipes in blocks 115 and 117 into alignment. As described further below, the mechanical alignment system only needs to achieve alignment to within about 100 μm and can be designed to permit quick or automatic attachment of adjacent blades 110. In accordance with an aspect of the inventions, light pipes in block 117 are larger than light pipes in block 115 by a margin sufficient to compensate for the expected alignment error allowed by the mechanical alignment system. For example, if light pipes in block 115 on the transmitter side are about 50 μm in diameter, light pipes in block 117 on the receiving side can be about 250 μm in diameter to tolerate alignment errors and beam expansion up to about 100 μm.

The gap between blocks 115 and 117 can be on the order of a few mm wide. In contrast, the separation between transmitter array 113 and receiver array 119 may be on the order of a few cm, e.g., about 5 cm in an exemplary embodiment, so that each block 115 and 117 would typically be more than 1 cm long. The relatively small size of the gap between the light pipes reduces the effects of beam divergences and angular alignment errors between transmitter array 113 and receiver array 119. A collimated signal beam can thus be transmitted across the free-space gap without incurring unacceptable signal loss. In contrast, direct transmission of signal beams across the several cm between transmitter array 113 and receiver array 119 would generally cause a much greater signal loss.

Arrays 113 and 119, which are respectively described as transmitter arrays and receiver arrays above, more generally can be transceiver arrays that include both transmitters (e.g., VCSELs or LEDS) and receivers (e.g., photodiodes.) In such an embodiment, block 115 would include smaller light pipes for optical signals transmitted from array 113 and larger light pipes for optical signals receive by array 113. Optical array 114 would contain collimating lenses and focusing lenses. The collimating lenses collimate the beams from transmitters in array 113 to produce beams having a diameter corresponding to the smaller light pipes. Each focusing lens focuses a beam having a size corresponding to the larger light pipes onto an active area of a detector in array 113. Similarly, for bidirectional communication, block 117 may contain light pipes of both sizes, and optical array 118 may contain both focusing lenses and collimating lenses. The collimating lenses in optical system 118 and smaller light pipes in block 117 collimate and direct optical signals transmitted from array 119, and the larger light pipes in block 117 and the focusing lenses in optical array 118 direct and focus optical signals on to the active areas of detectors in array 119. This bidirectional optical communications otherwise operate in the same manner as one-way transmissions described above.

Each blade 110 further contains one or more transmitter/receiver arrays 133 for communication with backplane 130. For these optical communication channels, each blade 110 includes an optical array 134, a block of light pipes 135, and an optical turning system 136. Optical array 134 includes collimating lenses for optical signals transmitted from array 133 and focusing lenses for optical signals received via larger light pipes in block 135. Block 135 also includes smaller light pipes for the collimated optical signals from array 133.

Backplane 130 includes multiple blocks 137 of light pipes and multiple optical arrays 138. Each block 137 can include larger light pipes for optical signals that backplane 130 receives through block 137 and smaller light pipes for optical signals that exit backplane 130 through block 137. Correspondingly, each optical array 138 includes focusing lenses and collimating lenses. The focusing lenses can be use to focus received optical signals into optical devices such as photodiodes or into optical waveguides or fibers. In particular, backplane 130 can include waveguides or optical fibers that run between blocks 137. In such a configuration, blades 110 can communicate with each other using optical signals relayed through backplane 130. Backplane 130 can alternatively or additionally include device arrays 139 containing optical transmitters or receivers for optical signals that originate in backplane 130 or are converted into electrical signals in backplane 130.

Backplane 130, in the illustrated embodiment, is substantially perpendicular to blades 110 so that electrical terminals of blades 110 can be easily inserted into slots in backplane 130. Optical turning system 136 turns optical signals by 90° and can be a mirror or prism that reflects optical signal beams passing between blocks 135 and 137. Optical turning system 136 can be permanently attached to block 135 or 137, or optical turning system 136 can be part of a mechanical alignment that is employed when a blade 110 is plugged into backplane 130 or chassis 120.

Figure 2:
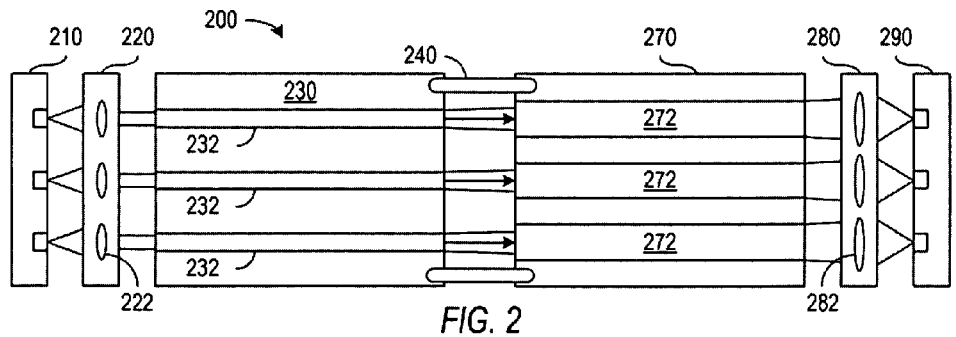
FIG. 2 shows a cross-sectional view of a system using asymmetric light pipes to establish free-space optical communications in accordance with an embodiment of the invention.

FIG. 2 shows a cross-sectional view of a system 200 implementing optical communication channels in accordance with an embodiment of the invention. System 200 includes a transmitter array 210, an optical array 220, a light pipe block 230, a mechanical alignment system 240, a light pipe block 270, an optical array 280, and a receiver array 290. Communication system 200 can be employed in a server system such as illustrated in FIG. 1 or more generally in any system employing optical communication channels between components.

Array 210 can be a semiconductor device containing multiple light emitting devices such as laser diodes or light emitting diodes or can be a passive device including the ends of optical fibers or waveguides carrying optical signals. In an exemplary embodiment, array 210 includes laser diodes (e.g., VCSELs) and associated encoding circuitry that encodes data from electrical signals to be transmitted as a modulated optical signal. Using current technology, such optical signals can carry data at rates of about 10 Gb/s and higher. Current laser diodes can produce signal beams having diameters of less than about 10 µm (e.g., about 6 µm) and an angle of divergence of about 13°.

Optical array 220 is adjacent to transmitter array 210 to position collimating lenses 222 so that the divergent signal beams from transmitter array 210 become collimated. Ideally, the collimated beams are roughly the same size as light pipes 232, so that most of the optical power in the optical signal enters light pipes 232. In an exemplary embodiment of the invention, the collimated beam has a divergence of less than about 1° or 2°, and intensity profile that spreads most of the optical energy within a 50 µm diameter of a light pipe 232. This differs from the process of coupling an optical beam into a solid optical fiber because instead of collimating a beam, conventional processes for coupling a beam into an optical fiber attempt to focus the beam onto an end facet of the optical fiber.

Light pipes 232, which can be hollow tubes with reflective walls formed in a surrounding block 230, have far fields that are collimated. As a result, when a collimated optical signal is introduced at one end of light pipe 232, the beam emerges from the other end of light pipe 232 as a collimated beam. In the exemplary embodiment where light pipe 232 has a diameter of 50 µm and the optical signal enters light pipe 232 with a divergence angle of about 1° or less, the optical signal beam exits light pipe 232 with a diameter of 50 µm and a divergence angle of about 1° or less. Accordingly, an optical signal beam can be readily coupled into a larger light pipe 272, even when light pipes 232 and 272 are separated by several mm. The numerical aperture (NA) or angular divergence of a light pipe 232 is proportional to the ratio $\lambda/2w$ of the light wavelength $\lambda$ to the waveguide width w. For a 50-µm waveguide, the NA is around 0.017. This means that the optical signal beam size will increase from 50 µm to about 150 µm after propagating a free-space distance of 50 µm/0.017 or 3 mm. Thus, most of the light from a 50-µm waveguide can be effectively coupled into a 150-µm waveguide separated by that distance with little loss. The lateral misalignment tolerance will decrease linearly with the separation between the smaller light pipe and the larger light pipe. In general, a communication link using asymmetric light pipes can select the sizes and separation of the light pipes and trade-off signal loss with alignment tolerance as long as the optical power budget of the link is met. In contrast, optical fibers generally have larger numerical apertures, and signal beams exiting conventional optical fibers are not collimated. Accordingly, coupling of an optical signal from one optical fiber into another generally requires either that the ends of the optical fibers be in contact or very close to each other (e.g., butt-coupling of the optical fibers) or requires an optical system to focus the optical beam from one fiber onto the end of the next fiber. Use of light pipes 232 and 272 permits optical signal transmission across a free-space gap without requiring additional optical elements or incurring large signal loss.

Light pipes 272 are larger than light pipes 232 to accommodate errors in the alignment of light pipes 232 and 272. For example, in the exemplary embodiment where a light pipe 232 has a diameter of 50 µm, the corresponding light pipe 272 can have a diameter of 150 µm or 250 µm to accommodate expected alignment errors up to 50 µm or 100 µm. If the systems on which light pipe blocks 230 and 270 are mounted are such that the expected alignment error is automatically less than the margin provided by the larger size of light pipe 272, no physical connection is required between blocks 230 and 270. This avoids the need to operate a mechanical alignment system and is preferred in many applications.

In some embodiments of the invention, a mechanical alignment system can be employed to ensure that the alignment error is within the margin provided by difference in the sizes of light pipes 232 and 272. FIG. 2 illustrates an embodiment of the invention having a mechanical alignment system that includes pins 240 (e.g., a structure with three or more projections) that fit into corresponding notches in blocks 230 or 270. Such alignment pins 240 can be rounded or tapered, so that as blocks 230 and 270 are brought into proximity, the shape of pins 240 and matching notches shift blocks 230 and 270 relative to each other to improve alignment. The alignment system generally can be secured to one block 230 or 270 and engage the other block 270 or 230 during system assembly. When fully engaged, alignment pins 240 dictate relative separation, perpendicular offsets, pitch, yaw, and roll of blocks 230 and 270. In a system such as a blade server system, the alignment mechanism is preferably easy to operate, so that blades can be easily inserted and removed.

The collimated optical signal beams that cross the free-space gap and enter light pipes 272 in block 270 remain collimated upon exit from light pipes 272. Optical array 280 includes focusing lenses 282 having sizes selected according to the size of light pipes 272 and having focal lengths selected to focus the optical signal beams on active areas of optical receivers in array 290. Alternatively, focusing lenses 282 can be used to focus the optical signals for coupling into an optical fiber, a wave guide, or other optical element.

Figure 3:
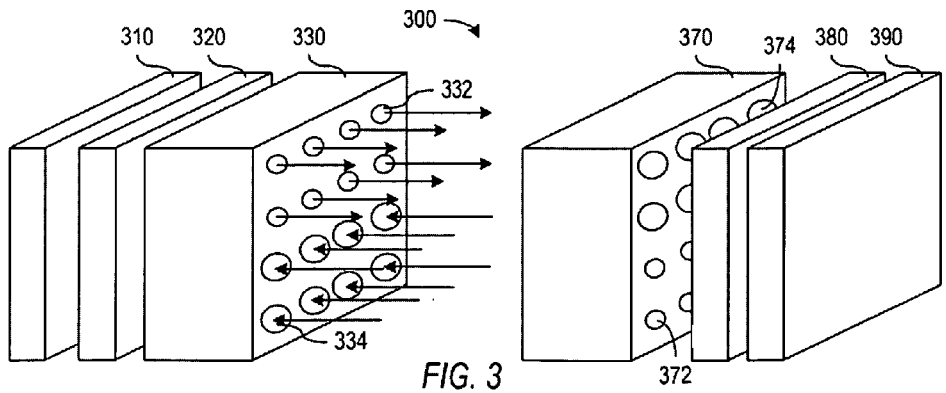
FIG. 3 shows a perspective view of a bidirectional, free-space, optical communication system using asymmetric light pipes in accordance with an embodiment of the invention.

FIG. 3 shows a perspective view of bidirectional optical communication system 300 in accordance with an embodiment of the invention. Communication system 300 includes a transceiver array 310, an optical array 320, and a light pipe block 330 that are separated by a free-space gap from a light pipe block 370, an optical array 380, and a transceiver array 390. Transceiver arrays 310 and 390 include both optical transmitters and optical receivers, but the receivers and transmitters in array 310 are arranged to be aligned respectively with transmitters and receivers in array 390. Optical array 320 includes collimating and focusing lenses respectively aligned with transmitters and receivers in array 310. Light pipe block 330 similarly includes smaller light pipes 332 (e.g., having a diameter of about 50 µm) and larger light pipes 334 (e.g., having a diameter of about 250 µm) respectively aligned with transmitters and receivers in array 310. Light pipe block 370 includes larger light pipes 374 nominally aligned with the smaller light pipes 332 in block 330 and has smaller light pipes 372 nominally aligned with the larger light pipes 334 in block 330. Collimating and focusing lenses in optical array 380 are respectively aligned with light pipes 372 and 374 and with transmitters and receivers in array 390.

Figure 4:
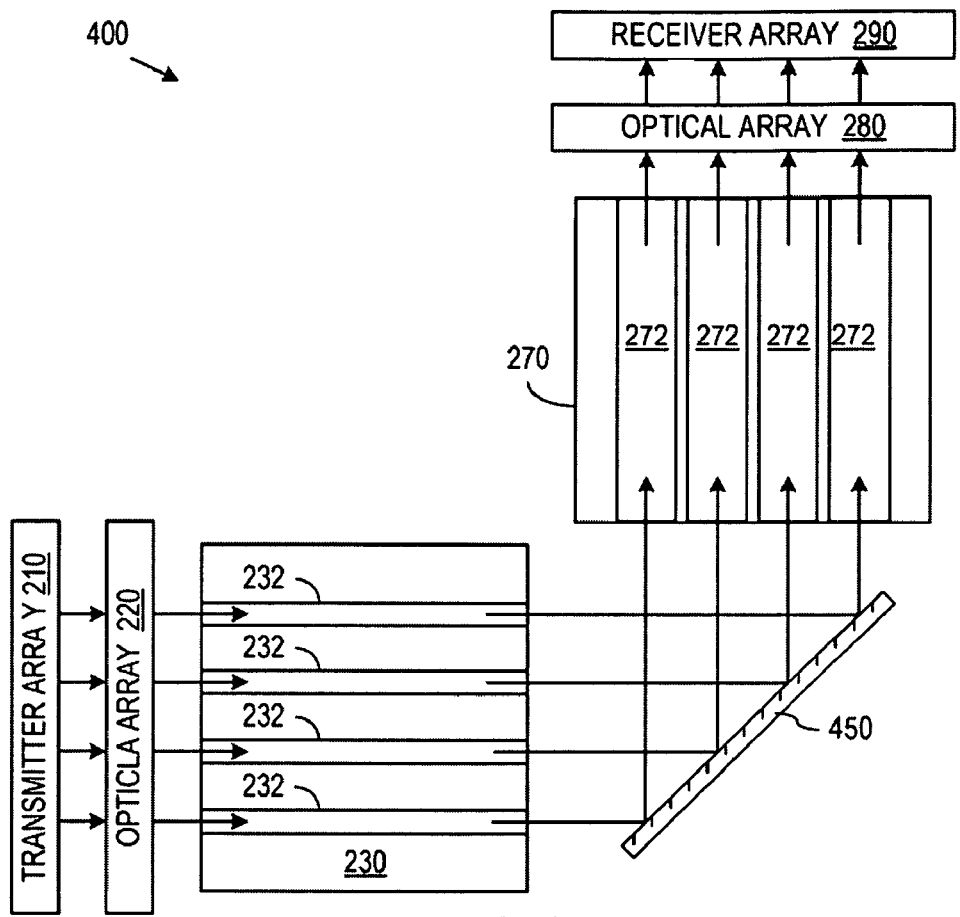
FIG. 4 shows a cross-sectional view of a system in accordance with an embodiment of the invention using asymmetric light pipes to establish free-space optical communications between components that are perpendicular to each other.

FIG. 4 shows a cross-sectional view of a communication system in accordance with an embodiment of the invention in which a transmitter array 210, optical array 220, and light pipe block 230 are substantially perpendicular to light pipe block 270, optical array 280, and receiver array 290. A turning mirror 450 is thus included in system 400 to change the free-space paths of the optical signals so that collimated optical signal beams emerging from light pipes 232 in block 230 are directed into the light pipes 272 in block 270. The operation of the components 210, 220, 230, 270, 280, and 290 are otherwise substantially the same as described above with reference to FIG. 2. It may be additionally noted that turning mirror 450 could similarly be used in a bidirectional communication system such as system 300 or FIG. 3 to reflect and redirect optical signals traveling in opposite directions.

Figure 5:
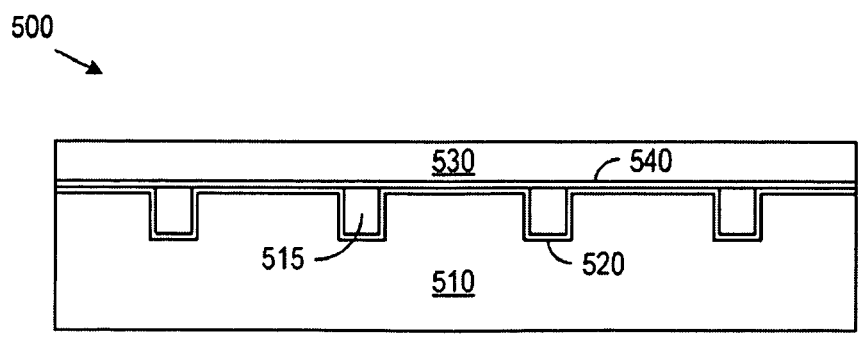
FIG. 5 shows a block of light pipes that can be fabricated using an injection molding process in accordance with an embodiment of the invention.

Blocks of light pipes such as used in the above described embodiments can be constructed using a variety of different techniques. FIG. 5 illustrates the construction of light pipe block 500 in accordance with an exemplary embodiment of the invention. Light pipe block 500 includes a base 510 that can be injection molded to include a surface having a series of trenches 515. In the illustrated embodiment, each trench 515 has a square cross-section and extends the length of base 510. Trenches 515 can all have the same dimensions for creation of light pipes of the same size or can be of different sizes for creation of different size light pipes, for example, for a bidirectional communication system. The trenches 515 and the surface of base 510 can be coated with a reflective coating such as metal coating or a multi-layer dielectric coating. A cap 530 having a reflective coating 540 can then be attached to base 510 to form square reflective tubes that form light pipes. Instead of cap 530, an additional base or bases that is or are similar to base 510 but having reflective bottom surfaces, can be attached to base 510 to create a light pipe block containing multiple rows and columns of light pipes.

Although the invention has been described with reference to particular embodiments, the description is only an example of the invention's application and should not be taken as a limitation. For example, although the above concentrates on describing interconnection within a computing system such as a blade server, such interconnection systems can be more generally applied between circuit boards that may be parallel or perpendicular to each other. Other adaptations and combinations of features of the embodiments disclosed are within the scope of the invention as defined by the following claims.

What is claimed is:

1. An optical interconnect system comprising:
   a first component including a first block through which a first light pipe extends, the first light pipe being positioned to receive a first optical signal and to direct the first optical signal for transmission from the first component, wherein the first light pipe comprises a hollow tube having reflective walls and a cross-section of a first size; and
   a second component including a second light pipe nominally aligned with the first light pipe and separated from the first light pipe by a free-space gap, wherein the second light pipe comprises a hollow tube having reflective walls and a cross-section of a second size that is larger than the first size, and wherein:
   the first block further includes a third light pipe that extends through the first block as a hollow tube having reflective walls and a cross-section of the second size;
   the second component further includes a fourth light pipe that comprises a hollow tube having reflective walls and a cross-section of the first size; and
   the third light pipe and the fourth light pipe are nominally aligned for transmission of a second optical signal from the second component, through the fourth light pipe, across the free-space gap, and into the third light pipe.

2. The system of claim 1, wherein the second size is larger than the first size by a margin that is large enough to accommodate expected error in alignment of the second light pipe with the first light pipe.

3. The system of claim 2, further comprising a mechanical alignment system that aligns the first light pipe with the second light pipe and controls the expected error in alignment.

4. The system of claim 1, wherein the first component further comprises:
   an optical transmitter that produces the first optical signal, and
   a collimating lens positioned to collimate the first optical signal before the first optical signal enters the first light pipe.

5. The system of claim 1, wherein:
   the first block further comprises a plurality of the first light pipes having cross-sections of the first size, the first light pipes being positioned to respectively receive a plurality of collimated optical signals for transmission from the first component; and
   the second component further comprises a plurality of the second light pipes having cross-sections of the second size and respectively being aligned with the first light pipes.

6. The system of claim 5, wherein:
   the first block further comprises a plurality of the third light pipes having cross-sections of the second size; and
   the second component further comprises a plurality of the fourth light pipes having cross-sections of the first size, the fourth light pipes being positioned to respectively receive a plurality of collimated optical signals for transmission from the second component and being respectively aligned with the third light pipes.

7. The system of claim 1, further comprising turning optics positioned in the free space gap, wherein the second light pipe is aligned so that the collimated optical signal after exiting the first light pipe and being redirected by the turning optics enters the second light pipe.

8. The system of claim 1, wherein the first component comprises a first blade in a server system.

9. The system of claim 8, wherein the second component comprises a second blade in the server system.

10. The system of claim 8, wherein the second system comprises a backplane of the server system.

11. The system of claim 1, wherein the second light pipe and the fourth light pipe extend through a second block.

12. A method for transmitting information comprising:
   directing a plurality of first optical signals from a first component respectively into a plurality of first light pipes extending through a first block, wherein each of the first light pipes comprises a hollow tube having reflective walls and having a cross-section of a first size;
   aligning a second block containing a plurality of second light pipes with the first block, wherein the aligning has an expected alignment error, and each of the second light pipes comprises a hollow tube having reflective walls and has a cross-section of a second size that is larger than the first size by a margin that accommodates the expected alignment error; and receiving the first optical signals from across a free-space gap between the first and second blocks and through the second light pipes into a second component.

13. The method of claim 12, further comprising:

directing a plurality of second optical signals from the second component respectively into a plurality of third light pipes extending through the second block; and receiving the second optical signals from across the free-space gap, respectively through a plurality of fourth light pipes in the first block, and into the first component.

14. The method of claim 13, wherein the third light pipes have the first size, and the fourth light pipes have the second size.

15. The method of claim 12, wherein the first and second components are blades in a server.

16. An optical interconnect system comprising:

a first block containing a first light pipe and a second light pipe, wherein the first light pipe comprises a hollow tube having reflective walls and a first cross-section, and the second light pipe comprises a hollow tube having reflective walls and a second cross-section that is larger than the first cross-section; and a second block containing a third light pipe and a fourth light pipe, wherein the third light pipe comprises a hollow tube having reflective walls and the second cross-section, the fourth light pipe comprises a hollow tube having reflective walls and the first cross-section, and wherein:

the first light pipe and the third light pipe are aligned for optical transmissions through the first light pipe, across a free space gap, and into the third light pipe; and the second light pipe and the fourth light pipe are aligned for optical transmissions through the fourth light pipe, across the free space gap, and into the second light pipe.

17. The system of claim 16, wherein the first block comprises a plurality of the first light pipes; and the second block comprises a plurality of the third light pipes, wherein the first light pipes are respectively aligned with the third light pipes for optical transmission of optical signals through the first light pipes, across the free space gap, and into the respective third light pipes.

18. The system of claim 16, wherein the second size is larger than the first size by a margin that is large enough to accommodate expected error in alignment of a first component to which the first block is attached and a second component to which the second block is attached.

19. The system of claim 18, wherein the first and second components are blades in a server.

20. The system of claim 16, further comprising an alignment system that engages the first block and the second block, mechanically aligns the first light pipe with the third light pipe, and mechanically aligns the second light pipe and the fourth light pipe.

* * * * *